2 Sheets—Sheet 1.

C. H. WORTHEN.
STOP MOTION FORKS FOR LOOMS.

No. 175,633.      Patented April 4, 1876.

Witnesses.
S. N. Piper
L. W. Müller

Charles H. Worthen
by his attorney.
R. H. Eddy

2 Sheets—Sheet 2.

C. H. WORTHEN.
STOP MOTION FORKS FOR LOOMS.

No. 175,633. Patented April 4, 1876.

Witnesses.  Charles H Worthen
by his attorney
R H Eddy

UNITED STATES PATENT OFFICE.

CHARLES H. WORTHEN, OF NEWBURYPORT, MASSACHUSETTS.

IMPROVEMENT IN STOP-MOTION FORKS FOR LOOMS.

Specification forming part of Letters Patent No. 175,633, dated April 4, 1876; application filed December 29, 1875.

*To all whom it may concern:*

Be it known that I, CHARLES H. WORTHEN, of Newburyport, of the county of Essex and State of Massachusetts, have invented a new and useful Improvement in Stop-Motion Forks for Looms; and do hereby declare the same to be fully described in the following specification and represented in the accompanying drawings, of which—

Figure 1:
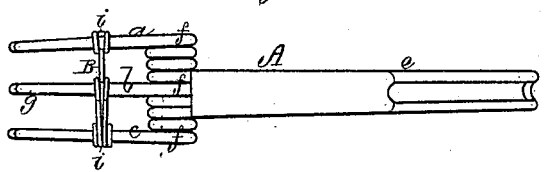
Figure 2:
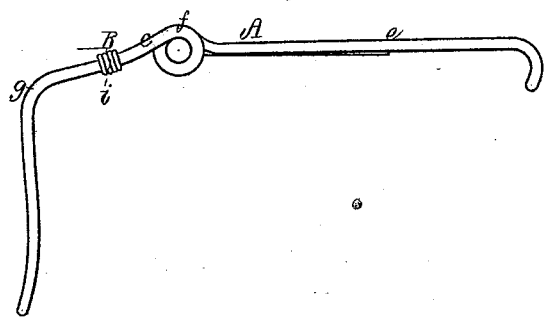

Figure 1 is a top view, and Fig. 2 a side elevation, of a stop-motion or filling fork constructed in accordance with my invention, which specially relates to the peculiar wire fork, as described and represented in the United States Patents No. 114,307, dated May 2, 1871, and No. 139,251, dated May 27, 1873, and granted to Jacob Haskell Knowles; and my invention consists in the combination of such a fork and a brace extended from prong to prong in advance of their pivotal helices, and fastened to the prongs. The said brace I usually project a short distance beyond each of the two outside prongs; or I provide either or each of them with a projection to limit the rise of the shank portion of the fork while the latter may be in use.

Figure 3:
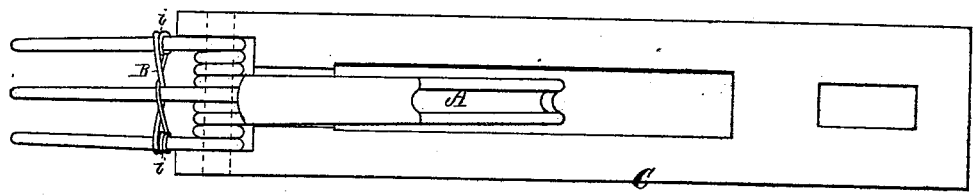
Figure 4:
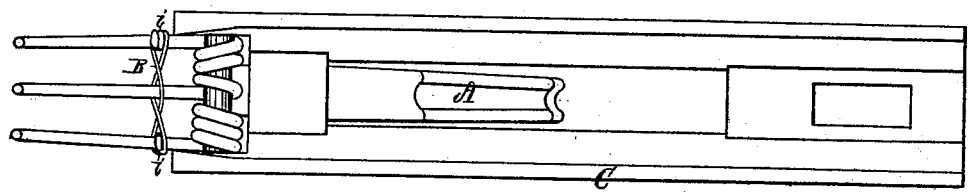
Figure 5:
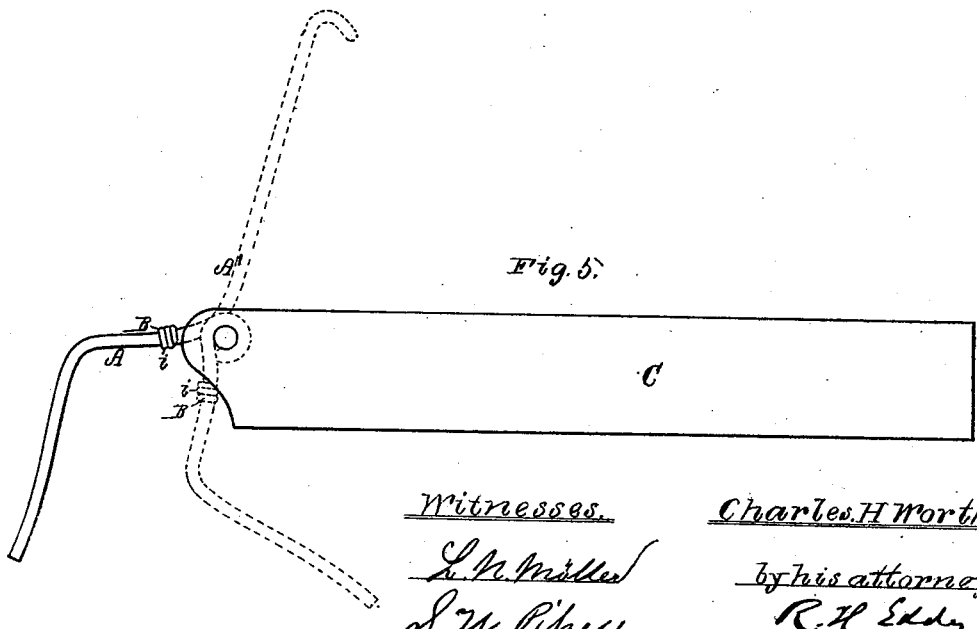

Fig. 3 is a top view, Fig. 4 a bottom view, and Fig. 5 a side elevation, of one of said forks and its supporting-slide, the latter being shown at C.

In Fig. 5 the fork is represented at A' by dotted lines in the position in which, when thrown up, it is arrested by the projections *i i* of the brace B.

The object of the brace is to prevent the prongs not only from being bent at or near their helices, but from spreading apart, so as to cause the fork to bind in its supporting-slide, and, as a consequence, not operate properly. While the wire fork is in use its prongs are liable to be struck by the shuttle and bent out of place, particularly at and near or in their pivotal helices, it being often a difficult matter to restore a prong so bent to its normal condition. It has been found in practice that the brace effectually prevents such accidents, or, at any rate, greatly lessens the chances of their occurrence.

In the drawings, the fork A is represented as having three tines or prongs, *a b c*, and with a shank, *e*, the pivotal helices of the prongs being shown at *f f f*. Each prong, at a short distance in advance of its pivotal helix, is bent downward, as shown at *g*. The brace represented at B as extended across the fork from prong to prong and connected to each, it being arranged in advance of the pivotal helices, I usually compose of a piece of wire bent around each prong one or more times, and carried from each prong to that next adjacent, it being secured in place and together by solder applied to it and one or more of the prongs. By having the brace extend a short distance outwardly beyond each or one of the outside prongs, each of the extensions shown at *i i* serves as a stop or means of preventing the shank *e* from being accidentally thrown up into a vertical position, and thereby rendered for a time inoperative, as it is liable to be without the extension or extensions. When the fork, by the weft, is suddenly turned, so as to cause the shank to be forced upward, the extension or extensions, by being carried into contact with the end of the carrying-slide, to which the fork is usually pivoted, will, with such end, arrest the upward movement of the shank, and thus prevent it from being elevated too high.

I do not claim a stop-motion fork made of wire in the manner as represented in the aforesaid patent, or with three or other suitable number of prongs.

I claim—

1. In combination with the wire stop-motion fork A and its supporting-slide C, a brace, B, applied and fixed to the prongs of the said fork in advance of their pivotal helices, the same being adapted to prevent the prongs from spreading so as to bind in the supporting-slide.

2. In combination with the wire stop-motion fork A and its supporting-slide C, as described, the brace B, adapted to connect the prongs in advance of their pivotal helices, and made to project beyond either or both of the outermost of said prongs, as set forth, whereby the fork is prevented from being thrown into a vertical position, as shown and described.

CHAS. H. WORTHEN.

Witnesses:
R. H. EDDY,
J. R. SNOW.